United States Patent
Smith (10) Patent No.: US 11,897,299 B2
(45) Date of Patent: *Feb. 13, 2024

(54) MOUNTING BRACKET ASSEMBLIES AS WELL AS SUSPENSION ASSEMBLIES, KITS AND METHODS INCLUDING SAME

(71) Applicant: Firestone Industrial Products Company, LLC, Nashville, TN (US)

(72) Inventor: Scott A. Smith, Brownsburg, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,014

(22) Filed: Oct. 10, 2022

(65) Prior Publication Data

US 2023/0105366 A1      Apr. 6, 2023

Related U.S. Application Data

(63) Continuation of application No. 17/039,684, filed on Sep. 30, 2020, now Pat. No. 11,472,247.

(Continued)

(51) Int. Cl.
*B60G 11/28* (2006.01)
*B60G 11/27* (2006.01)

(52) U.S. Cl.
CPC .............. *B60G 11/28* (2013.01); *B60G 11/27* (2013.01); *B60G 2202/152* (2013.01); *B60G 2204/126* (2013.01); *B60G 2204/43* (2013.01)

(58) Field of Classification Search
CPC .......... B60G 2204/43; B60G 2204/126; B60G 11/27; B60G 11/28
See application file for complete search history.

(56) References Cited

U.S. PATENT DOCUMENTS

| | | |
|---|---|---|
| 2,196,954 A | 4/1940 | Herschel |
| 2,226,605 A | 12/1940 | Geyer et al. |

(Continued)

FOREIGN PATENT DOCUMENTS

| | | |
|---|---|---|
| DE | 20210955 U1 | 9/2002 |
| DE | 102017215348 A1 | 3/2018 |

(Continued)

OTHER PUBLICATIONS

Air Lift Company, Load Lifter 5000 Kit No. 57288 Installation Manual, (est.) Feb. 2018.

(Continued)

*Primary Examiner* — James A English
(74) *Attorney, Agent, or Firm* — Thomas R. Kingsbury; Matthew P. Dugan (57) ABSTRACT

Mounting bracket assemblies including a base bracket and a clamp. The base bracket includes a base bracket wall with a base wall portion having a first surface portion and a second surface portion. The base bracket is positioned along an existing jounce bumper mount of a vehicle with the first surface portion engaging a distal edge of the jounce bumper mount. The clamp is the base bracket and extends peripherally along a side wall portion of the jounce bumper mount in abutting engagement with an outer peripheral surface portion thereof and coextensively therewith. Suspension systems, mounting bracket kits and methods of assembling a mounting bracket assembly are also included.

20 Claims, 11 Drawing Sheets

Related U.S. Application Data (60) Provisional application No. 62/909,194, filed on Oct. 1, 2019.

(56) References Cited

U.S. PATENT DOCUMENTS

| | | | |
|---|---|---|---|
| 2,941,816 A | 6/1960 | Benson | |
| 2,955,814 A | 10/1960 | Locklin | |
| 3,319,952 A | 5/1967 | Travers | |
| 3,414,289 A | 12/1968 | Medley | |
| 3,578,355 A | 5/1971 | Oeder | |
| 5,342,139 A * | 8/1994 | Hoffman | F16B 5/065 |
| | | | 267/64.23 |
| 5,364,086 A | 11/1994 | Paton | |
| 5,403,032 A | 4/1995 | Hellwig | |
| 6,343,781 B1 | 2/2002 | Joseph | |
| 8,070,144 B2 * | 12/2011 | Lamb | B60G 11/22 |
| | | | 267/220 |
| 11,685,210 B2 * | 6/2023 | Al-Dahhan | B60G 7/04 |
| | | | 280/124.155 |
| 2002/0030312 A1 | 3/2002 | Capek et al. | |
| 2002/0180126 A1 | 12/2002 | DeLizo et al. | |
| 2008/0023931 A1 * | 1/2008 | Myers | B60G 11/28 |
| | | | 280/124.157 |
| 2008/0054584 A1 | 3/2008 | Leonard | |
| 2008/0265475 A1 | 10/2008 | Keeney et al. | |
| 2013/0249184 A1 * | 9/2013 | Munchel | B60G 11/28 |
| | | | 280/124.1 |
| 2017/0299010 A1 | 10/2017 | Black, Sr. | |
| 2019/0092407 A1 | 3/2019 | Jacobsma et al. | |
| 2023/0184352 A1 * | 6/2023 | Smith | B60R 16/08 |
| | | | 248/634 |

FOREIGN PATENT DOCUMENTS

| | | |
|---|---|---|
| DE | 102017004115 A1 | 10/2018 |
| EP | 2042412 B1 | 8/2011 |
| EP | 2385269 A2 | 11/2011 |
| EP | 2998136 A1 | 3/2016 |
| EP | 2990240 B1 | 3/2017 |
| EP | 3628887 A1 | 4/2020 |
| FR | 1181934 A | 6/1959 |
| GB | 2098700 B | 5/1985 |
| WO | 2016196502 A1 | 12/2016 |
| WO | 2017199457 A1 | 11/2017 |

OTHER PUBLICATIONS

Firestone Industrial Products Company, LLC, Ride-Rite Kit No. 2596 Installation Manual, May 2017.

* cited by examiner

MOUNTING BRACKET ASSEMBLIES AS WELL AS SUSPENSION ASSEMBLIES, KITS AND METHODS INCLUDING SAME

This application is a continuation of U.S. patent application Ser. No. 17/039,684, filed on Sep. 30, 2020, now U.S. Pat. No. 11,472,247, issued on Oct. 18, 2022, which claims the benefit of priority to U.S. Provisional Patent Application Ser. No. 62/909,194, filed on Oct. 1, 2019, the contents of each of which is hereby incorporated herein by reference in its entirety.

BACKGROUND

The subject matter of the present disclosure broadly relates to the art of vehicle suspension systems and, more particularly, to mounting bracket assemblies for securing suspension components to sprung and/or unsprung masses of vehicles. Suspension assemblies for vehicles, mounting bracket kits and methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of a vehicle to move in a somewhat controlled manner relative to one another. Generally, the plurality of spring devices function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

It is well known for vehicles of some types and kinds to use supplemental suspension springs, which are sometimes referred to in the art as "helper springs", on vehicles, such as in applications in which a vehicle will be fitted with additional equipment or routinely transport higher weight loads, for example. It will be appreciated that such supplemental suspension springs can be mounted on existing vehicles and/or vehicle structures in any one of a variety of ways and/or using any one of a variety of known mounting arrangements.

One disadvantage of known supplemental suspension systems, however, is that installation of the same often requires substantial disassembly of existing suspension components of the vehicle. This can, in some cases, significantly increase the time and effort involved in installing the supplemental suspension system. Additionally, this can undesirably increase the level of complexity of the installation, which could, in some cases, exceed the capability and/or comfort level of some self-installers.

Additionally, in some cases, components that are disassembled may be discarded and replaced by new components that are supplied with the supplemental suspension system that is being installed on the vehicle. Sometimes, the new components are significantly different than the existing components. However, in many cases the new components are quite similar to the original parts and only include minor changes or modifications thereto, such as for mounting the supplemental suspension system or components thereof on the associated vehicle, for example. However, it is generally deemed undesirable to modify the original or existing parts of a vehicle (i.e., a field modification made by the installer at the time of installation) as this can significantly increase the level of complexity and/or effort involved in the installation. As such, new components are typically included with the supplemental suspension system and the original components discarded. This, however, leads to an undesirable increase in the costs associated with the supplemental suspension system. Additionally, such arrangements also undesirably result in the discarding of otherwise usable parts and/or components.

As such, it is believed desirable to develop a mounting bracket assembly as well as a suspension assembly, a mounting bracket kit and a method of installation using such a mounting bracket assembly that may improve factors such as time, complexity and/or ease of installation, that may increase the usage of existing vehicle components, and/or that may overcome the foregoing and other disadvantages of known arrangements.

BRIEF SUMMARY

One example of a mounting bracket assembly in accordance with the subject matter of the present disclosure can secure an associated suspension component along one of an associated sprung mass and an associated unsprung mass of an associated vehicle. The one of the associated sprung and unsprung masses can include an associated jounce bumper mount with an associated longitudinal axis and an associated side wall portion extending toward an associated distal edge at least partially defining an associated open end. The associated side wall portion can include an associated outer peripheral surface portion. The mounting bracket assembly can include a base bracket and a clamp. The base bracket can include a base bracket wall with a base wall portion oriented transverse to the associated longitudinal axis. The base wall portion can include a first surface portion and a second surface portion facing opposite the first surface portion. The base bracket can be positioned along the associated jounce bumper mount with the first surface portion dimensioned to abuttingly engage the associated distal edge of the associated jounce bumper mount and to extend at least partially across the associated open end thereof. The clamp can be secured to the base bracket along the first surface portion thereof and can extend peripherally along the associated side wall portion of the associated jounce bumper mount in abutting engagement with the associated outer peripheral surface portion and co-extensively therewith.

One example of a suspension system in accordance with the subject matter of the present disclosure can be operatively disposed between associated sprung and unsprung masses of an associated vehicle. The suspension system can include a jounce bumper mount operatively connected to one of the associated sprung and unsprung masses. The jounce bumper mount can have a longitudinal axis and can include a mount wall with an end wall portion disposed in transverse relation to the axis and a side wall portion extending axially from along the end wall portion toward a distal edge. The side wall portion can include an outer peripheral surface portion and an inner peripheral surface portion with the inner peripheral surface portion at least partially defining a cavity within the jounce bumper mount having an open end along the distal edge. The jounce bumper mount can be oriented such that the end wall portion is disposed toward the one of the associated sprung and unsprung masses and such that the open end is disposed toward the other of the associated sprung and unsprung masses. A base bracket can include a base bracket wall with a base wall portion oriented transverse to the longitudinal axis. The base wall portion can include a first surface portion and a second surface portion facing opposite the first surface portion. The base bracket can be positioned along the jounce bumper mount with the first surface portion disposed in abutting engagement with the distal edge of the jounce bumper mount and extending at least partially across the open end thereof. A clamp can be secured to the base bracket along the first surface portion thereof and can extend at least partially along the side wall portion of the jounce bumper mount in abutting engagement with the outer peripheral surface portion. A suspension component can be operatively secured to the base bracket along the second surface portion thereof.

Mounting bracket kits and methods of assembling a mounting bracket are also included.

DETAILED DESCRIPTION

Turning now to the drawings, it is to be understood that the showings are for purposes of illustrating examples of the subject matter of the present disclosure and that the showings are not intended to be limiting. Additionally, it will be appreciated that the drawings are not to scale and that portions of certain features, elements and/or structures may be exaggerated for purposes of clarity and/or ease of understanding.

Figure 1:
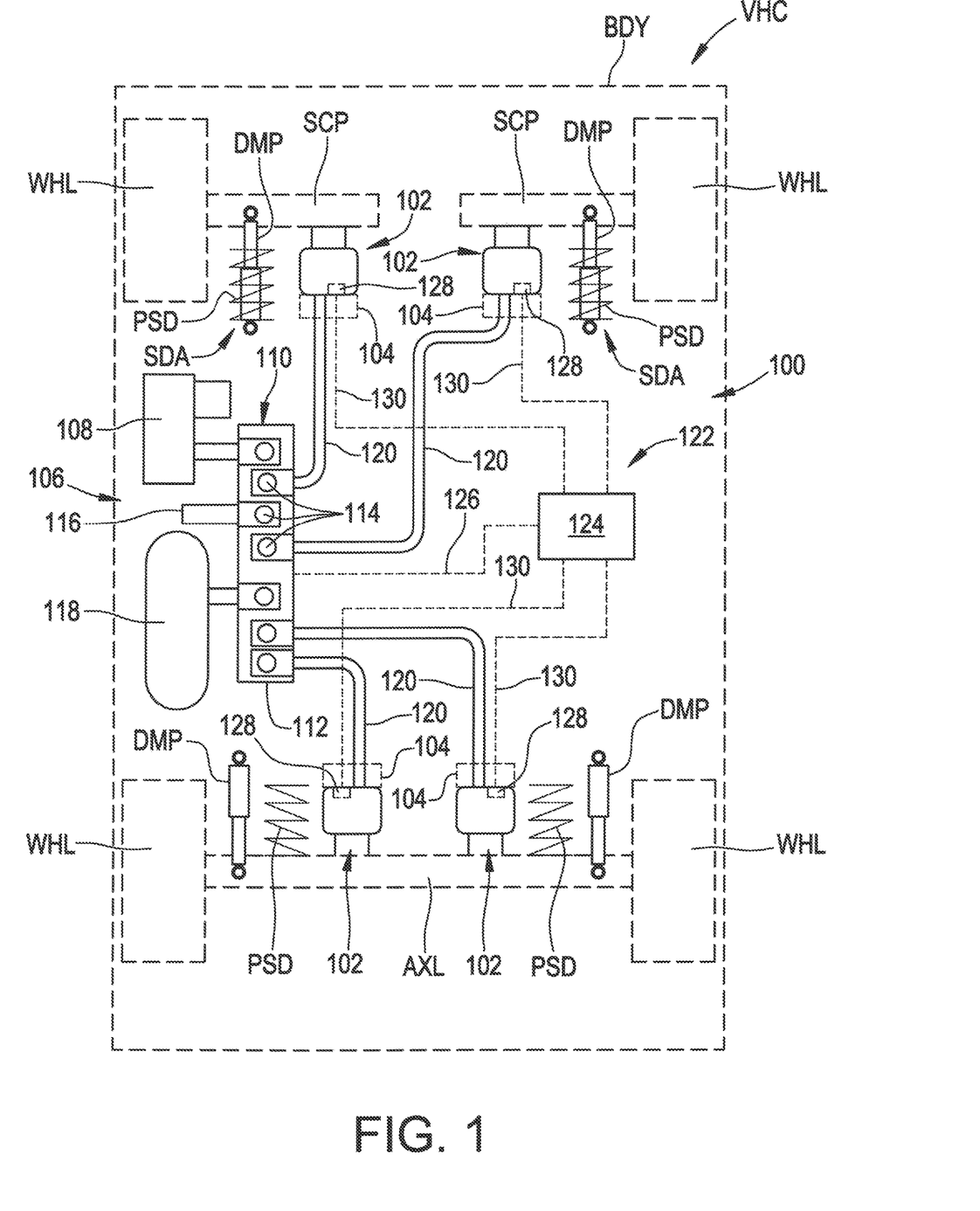
FIG. 1 is a schematic representation of one example of a suspension system of an associated vehicle that includes supplemental suspension in accordance with the subject matter of the present disclosure.
Figure 2:
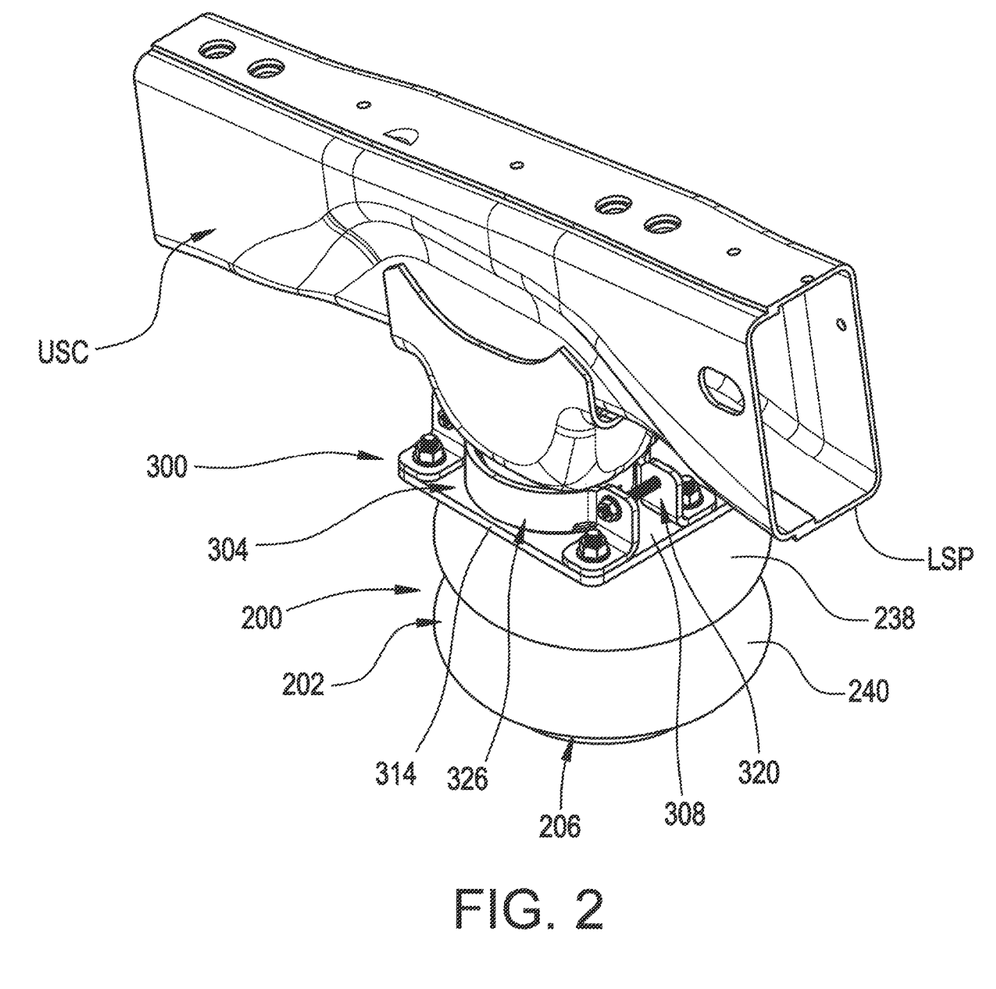
FIG. 2 is a top perspective view of one example of a mounting bracket assembly in accordance with the subject matter of the present disclosure shown assembled with an associated vehicle component and an associated suspension component.
Figure 3:
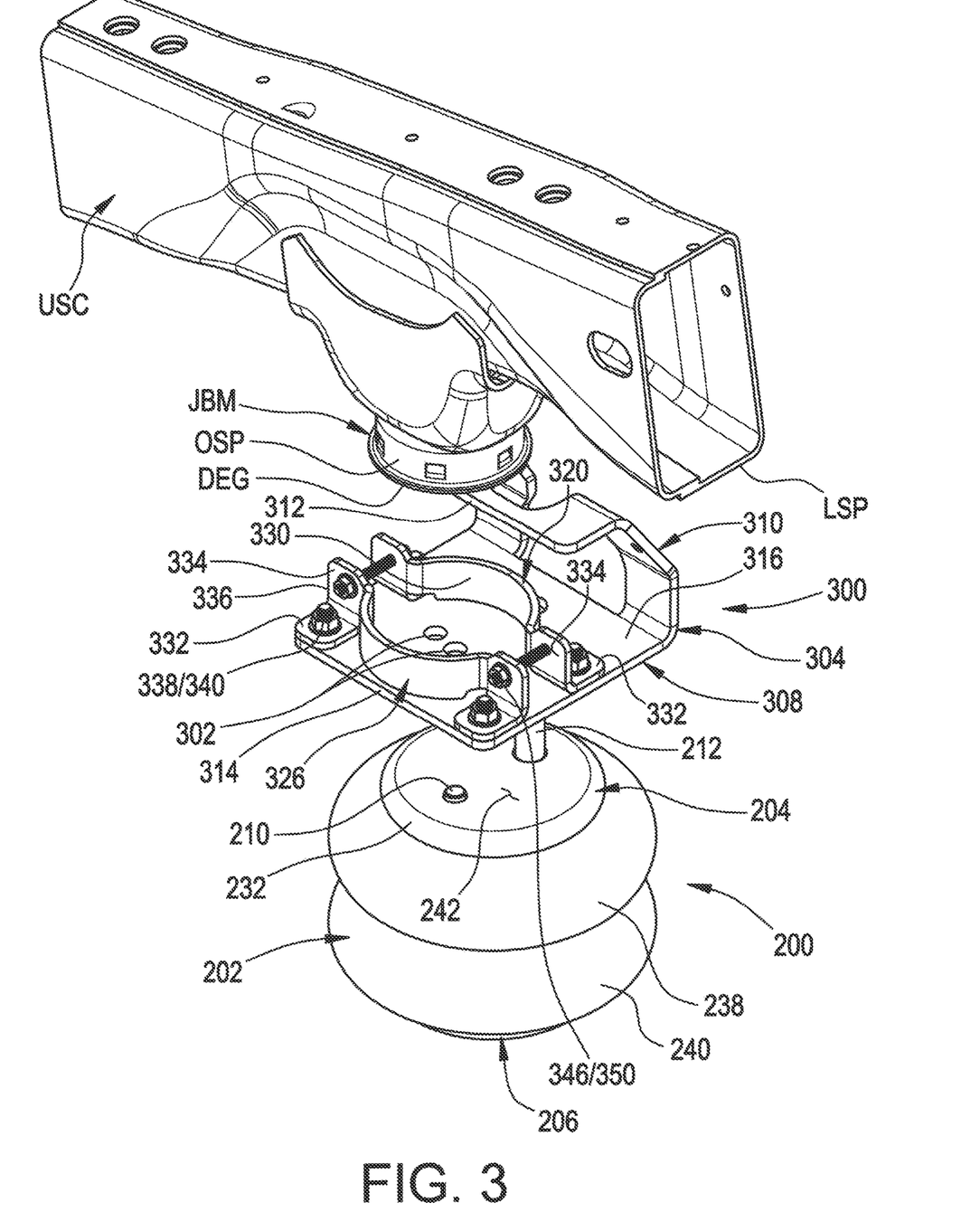
FIG. 3 is a top perspective view of the exemplary mounting bracket assembly in FIG. 2 shown prior to assembly with the associated vehicle component and the associated suspension component.
Figure 4:
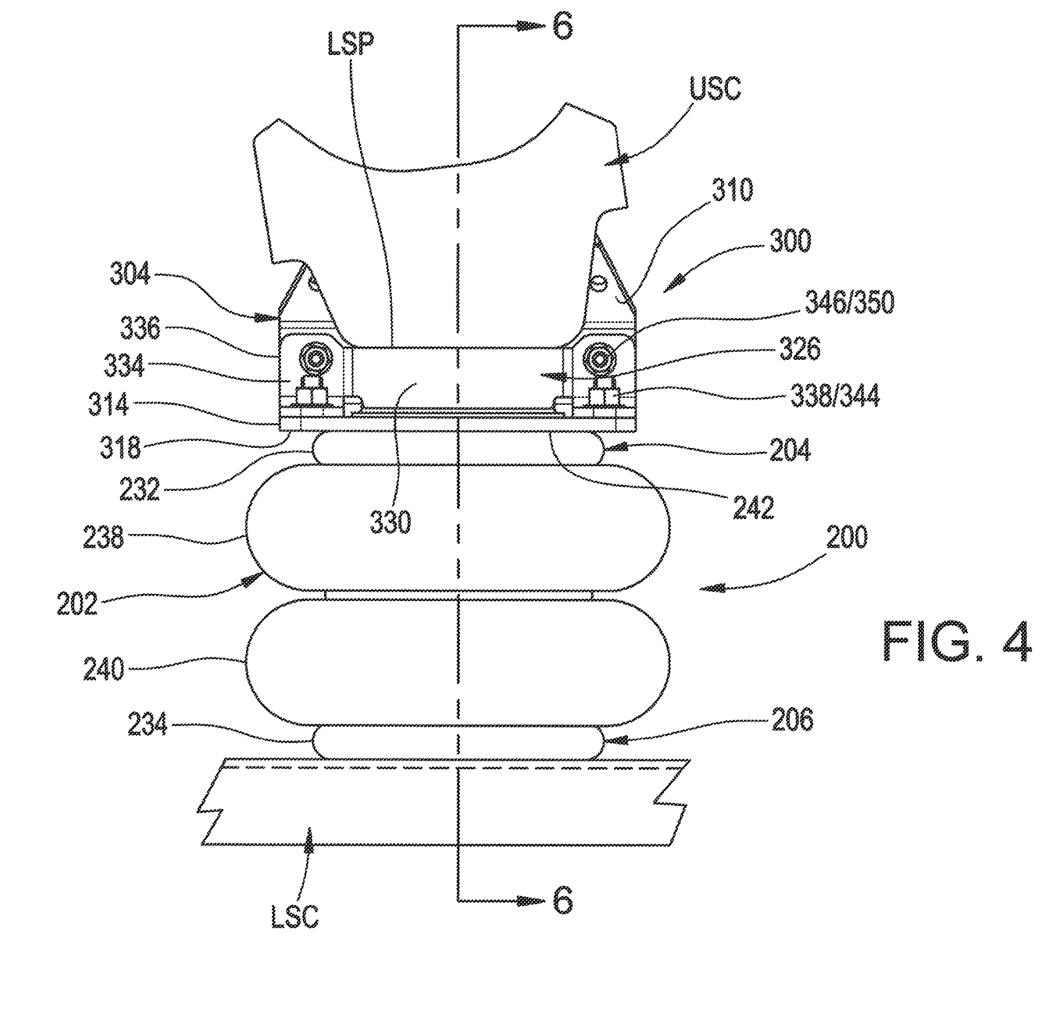
FIG. 4 is a side elevation view of the exemplary mounting bracket assembly in FIGS. 2 and 3.
Figure 5:
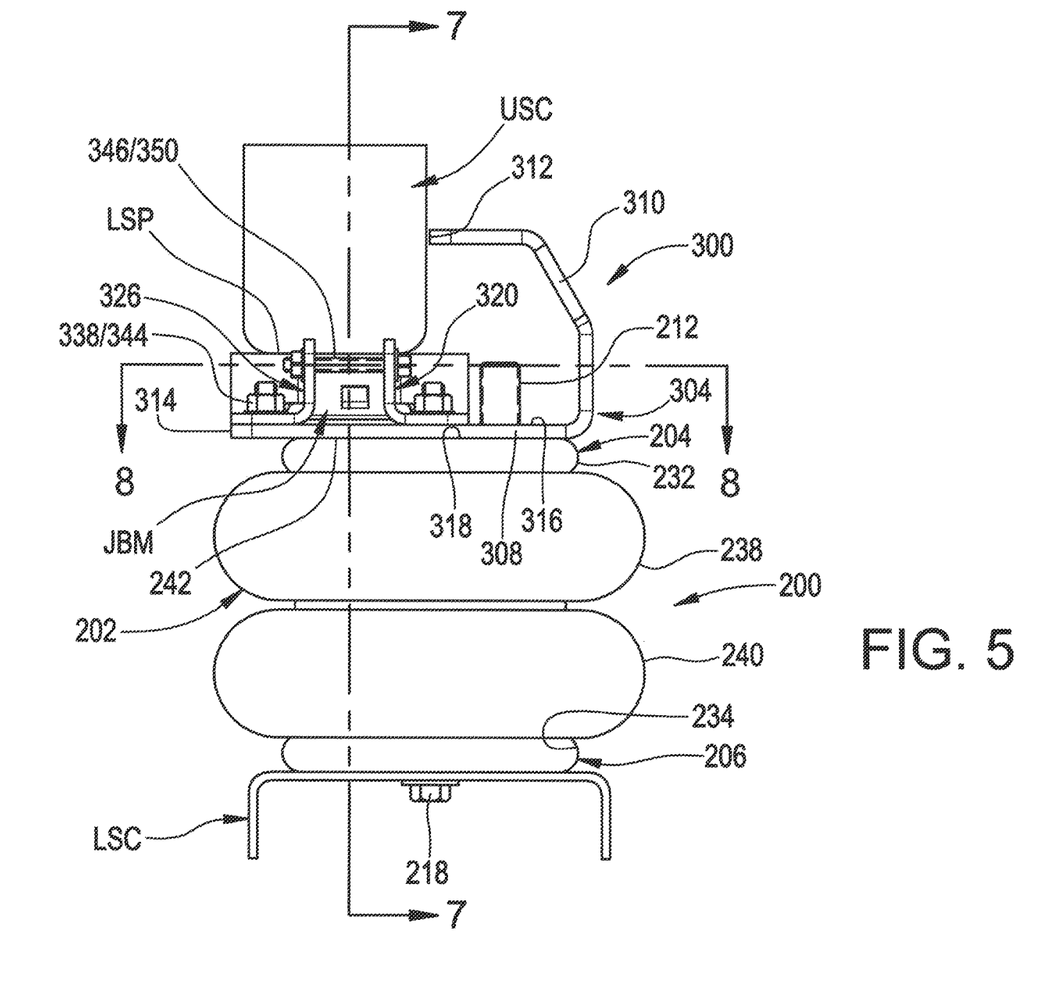
FIG. 5 is a front elevation view of the exemplary mounting bracket assembly in FIGS. 2-4.

FIG. 1 illustrates one example of a suspension system 100 disposed between a sprung mass, such as an associated vehicle body BDY, for example, and an unsprung mass, such as an associated wheel WHL, an associated structural component SCP or an associated axle AXL, for example, of an associated vehicle VHC. It will be appreciated that any one or more of the components of the suspension system can be operatively connected between the sprung and unsprung masses of the associated vehicle in any suitable manner.

For example, suspension system 100 can include a plurality of primary spring devices PSD, such as coil, leaf and/or torsion springs, for example, that are supported between the sprung and unsprung masses of the associated vehicle. Depending on desired performance characteristics and/or other factors, the suspension system may, in some cases, include damping members, such as dampers DMP, for example, of a typical construction (e.g., conventional struts or shock absorbers). In some cases, any such one or more damping members can be provided separately from the primary spring devices, and secured between the sprung and unsprung masses in a conventional manner, such as are included along axle AXL in FIG. 1, for example. In other cases, the damping members can be assembled together with a primary spring device such that at least a portion of the damping member is axially coextensive with the primary spring device forming spring and damper assemblies SDA, such as are included along structural components SCP in FIG. 1, for example.

In accordance with the subject matter of the present disclosure, suspension system 100 can also include one or more additional suspension components that are secured between the sprung and unsprung masses by way of a mounting bracket assembly in accordance with the subject matter of the present disclosure. For example, suspension system 100 can include one or more secondary or supplemental spring devices 102 that are secured between vehicle body BDY and structural component SCP or axle AXL by way of mounting bracket assemblies in accordance with the subject matter of the present disclosure, which are represented in FIG. 1 by dashed boxes 104. In the arrangement shown in FIG. 1, one secondary spring device 102 and one mounting bracket assembly 104 is disposed toward each corner of the associated vehicle adjacent a corresponding wheel WHL. It will be appreciated, however, that any other suitable number of secondary spring devices and/or mounting bracket assemblies could alternately be used in any other configuration and/or arrangement. Additionally, it will be recognized that the secondary spring devices shown in FIG. 1 appear to be of a type and kind commonly referred to as gas spring assemblies having a rolling lobe-type construction. It is to be understood, however, that the secondary spring devices shown and described in connection with FIG. 1 are merely exemplary and that other types, kinds and/or constructions of spring devices (e.g., convoluted-type gas springs) and/or other suspension components (e.g., height sensors, jounce bumpers) could additionally or alternately be included.

In cases in which secondary spring devices 102 are of the type and kind commonly referred to as gas spring assemblies, suspension system 100 can also, optionally, include a pressurized gas system 106 that can be operatively associated with one or more of the secondary spring devices for selectively supplying pressurized gas (e.g., air) thereto and selectively transferring pressurized gas therefrom. In the exemplary arrangement shown in FIG. 1, pressurized gas system 106 includes a pressurized gas source, such as a compressor 108, for example, for generating pressurized air or other gases. A control device, such as a valve assembly 110, for example, is shown as being in communication with compressor 108 and can be of any suitable configuration or arrangement. In the exemplary embodiment shown, valve assembly 110 includes a valve block 112 with a plurality of valves 114 supported thereon. Valve assembly 110 can also, optionally, include a suitable exhaust, such as a muffler 116, for example, for venting pressurized gas from the system. Optionally, pressurized gas system 106 can include a reservoir 118 in fluid communication with compressor 108 and/or valve assembly 110, and suitable for storing pressurized gas at an elevated pressure (i.e., greater than atmospheric pressure) for an extended period of time, such as minutes, hours, days, weeks or months, for example.

Valve assembly 110 can be in communication with secondary spring devices 102 in any suitable manner, such as through suitable gas transfer lines 120, for example. As such, pressurized gas can be selectively transferred into and/or out of the secondary spring devices through valve assembly 110 by selectively operating valves 114, such as to alter or maintain vehicle height at one or more corners of the vehicle, for example.

Suspension system 100 can also include a control system 122 that is capable of communication with any one or more systems and/or components (not shown) of vehicle VHC and/or suspension system 100, such as for selective operation and/or control thereof. Control system 122 can include a controller or electronic control unit (ECU) 124 communicatively coupled with compressor 108 and/or valve assembly 110, such as through a conductor or lead 126, for example, for selective operation and control thereof, which can include supplying and exhausting pressurized gas to and/or from secondary spring devices 102. Controller 124 can be of any suitable type, kind and/or configuration.

Control system 122 can also, optionally, include one or more height (or distance) sensing devices 128, such as, for example, may be operatively associated with the secondary spring devices and capable of outputting or otherwise generating data, signals and/or other communications having a relation to a height of the secondary spring devices or a distance between other components of the vehicle. Height sensing devices 128 can be in communication with ECU 124, which can receive the height or distance signals therefrom. The height sensing devices can be in communication with ECU 124 in any suitable manner, such as through conductors or leads 130, for example. Additionally, it will be appreciated that the height sensing devices can be of any suitable type, kind and/or construction, such as may operate using sound, pressure, light and/or electromagnetic waves, for example.

Mounting bracket assemblies in accordance with the subject matter of the present disclosure can be used to secure one or more additional suspension components between associated sprung and unsprung masses. It will be recognized and appreciated that such additional suspension components can be of any suitable type, kind and/or construction, such as secondary (or supplemental) spring devices, height sensors and/or jounce bumpers for example. As a non-limiting example, secondary spring devices can include spring devices that utilize pressurized gas as the working medium thereof, which are commonly referred to as gas springs or gas spring assemblies. One non-limiting example of a suitable construction of a gas spring assembly that can be used as a secondary spring device (e.g., spring devices 102) is shown and described in connection with FIGS. 2-9. As shown therein, a gas spring assembly 200 is shown as having a longitudinal axis AX (FIG. 6) and can include a flexible spring member 202 extending peripherally about longitudinal axis AX. Gas spring assembly 200 can also include an end member (or end member assembly) 204 that can be secured to the flexible spring member in a suitable manner along one end thereof, such as by way of a crimped connection, for example. Gas spring assembly 200 can also include an end member (or end member assembly) 206 that is secured to the flexible spring member in a suitable manner along an opposing end thereof in spaced relation to end member 204, such as by way of a crimped connection, for example. Flexible spring member 202 can be secured on or along end members 204 and/or 206 in a substantially fluid-tight manner such that a spring chamber 208 (FIGS. 6 and 7) is at least partially defined by the flexible spring member between the end members.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. A mounting bracket assembly in accordance with the subject matter of the present disclosure can be disposed between and secure one of the end members to the corresponding sprung or unsprung mass that is associated therewith. As such, it will be appreciated that at least one of the end members of the gas spring assembly can include a suitable combination of components and/or structures to operatively connect the end member with a mounting bracket assembly according to the subject matter of the present disclosure.

In the arrangement shown in FIGS. 2-9, for example, end member 204 is secured along a first or upper structural component USC, such as associated vehicle body BDY in FIG. 1, for example, by way of a mounting bracket assembly 300 in accordance with the subject matter of the present disclosure. As a non-limiting example, one or more securement devices 210, such as threaded mounting studs, for example, can be included along end member 204. In some cases, the one or more securement devices can project outwardly from end member 204 and can be secured thereon in a suitable manner, such as, for example, by way of a flowed-material joint (not shown) or a press-fit connection (not identified). In such cases, one or more of securement devices 210 can extend through mounting holes 302 in mounting bracket assembly 300 and receive one or more threaded nuts or other securement devices (not shown), for example.

Additionally, one or more gas transfer ports can optionally be provided to permit fluid communication with spring chamber 208, such as may be used for transferring pressurized gas into and/or out of the spring chamber. For example, a connection can be provided on or along one of the end members (e.g., end member 204) such as may be used for attachment of a gas transfer line (e.g., one of gas transfer lines 120 in FIG. 1). In the exemplary arrangement shown in FIGS. 2-9, a connector fitting 212 is provided on or along one of the end members (e.g., end member 204) and can include a passage 214 extending through the end member in fluid communication with spring chamber 208.

End member 206 can be secured along a second or lower structural component LSC, such as structural component SCP or axle AXL in FIG. 1, for example, in any suitable manner. In some cases, a mounting bracket in accordance with the subject matter of the present disclosure could be used. In other cases, lower structural component LSC could include one or more mounting holes HLS extending therethrough. One or more securement devices 216, such as threaded passages (e.g., blind passages and/or through passages), for example, can be included along end member 206. In such cases, the one or more securement devices can be secured on or along the end member in a suitable manner, such as, for example, by way of a flowed-material joint (not shown) or a press-fit connection (not identified). Additionally, such one or more securement devices can be oriented relative to mounting holes HLS in lower structural component LSC to receive one or more threaded fasteners 218 (e.g., bolts) extending through mounting holes HLS and into cooperative engagement with securement devices 216 to secure end member 206 on or along lower structural component LSC.

Flexible spring member 202 can be of any suitable size, shape, construction and/or configuration. As one example, flexible spring member 202 can include a flexible wall 220 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 220 is shown extending in a longitudinal direction between opposing ends 222 and 224. In some cases, flexible wall 220 can, optionally, include a mounting bead disposed along either one or both of ends 222 and 224. In the arrangement shown in FIGS. 6 and 7, mounting beads 226 and 228 are shown as being respectively disposed along ends 222 and 224. In some cases, the mounting beads can, optionally, include a reinforcing device, such as an endless, annular bead core 230, for example.

It will be appreciated, that end members 204 and 206 can be of any suitable type, kind, configuration and/or construction, and that the ends of flexible spring member 202 can be secured on, along and/or otherwise interconnected between end members 204 and 206 in any suitable manner. As one non-limiting example, end members 204 and/or 206 can be of a type commonly referred to as a bead plate. End member 204 is shown as being secured to end 222 of flexible wall 220 using a crimped-edge connection in which an outer peripheral edge 232 of end member 204 is crimped or otherwise deformed around mounting bead 226 such that a substantially fluid-tight seal is formed therebetween. Similarly, end member 206 is shown as being secured to end 224 of flexible wall 220 using a crimped-edge connection in which an outer peripheral edge 234 is crimped or otherwise deformed around mounting bead 228 such that a substantially fluid-tight seal is formed therebetween.

Gas spring assembly 200 is shown as being of a type commonly referred to as a convoluted or bellows-type construction, and it will be appreciated that any suitable type or kind of convoluted spring construction can be used. As such, a flexible spring member according to the subject matter of the present disclosure can have any suitable number of one or more girdle hoops that are spaced apart from the ends of the flexible spring member to form a corresponding number of two or more convoluted wall portions. In the exemplary arrangement shown in FIGS. 2-9, flexible spring member 202 includes a girdle hoop 236 disposed approximately midway along flexible wall 220 between ends 222 and 224. A convoluted wall portion 238 extends between girdle hoop 236 and end member 204, and a convoluted wall portion 240 extends between the girdle hoop and end member 206. In a preferred arrangement, girdle hoop 236 is at least partially embedded within flexible wall 220, and can function to retard or otherwise inhibit radially-outward expansion of the flexible wall during use under inflated and/or use conditions.

Mounting bracket assemblies (e.g., mounting bracket assemblies 300) in accordance with the subject matter of the present disclosure are adapted for securement to an associate sprung mass and/or an associated unsprung mass of an associated vehicle. In particular, such mounting bracket assemblies are well suited for securement on or along existing structural components of associated vehicles. As one non-limiting example, upper structural component USC can include a lower surface portion LSP with a jounce bumper mount JBM projecting therefrom in a direction toward lower structural component LSC. It will be appreciated that upper structural component USC and jounce bumper mount JBM as well as lower structural component LSC are commonly provided as existing structures of an associate vehicle on or along which mounting bracket assembly 300 can be secured. Jounce bumper mount JBM can include a bumper mount axis BMA and a bumper mount wall BMW with an end wall portion EWP oriented transverse to bumper mount axis BMA and disposed toward lower surface portion LSP of upper structural component USC. Jounce bumper mount JBM can also include a side wall portion SWP extending in a generally axial direction from along end wall portion EWP toward a distal edge DEG that at least partially forms an open end OPN of the jounce bumper mount. Side wall portion SWP extends peripherally about bumper mount axis BMA to at least partially define a bumper mount cavity BMC. Additionally, side wall portion SWP includes an outer surface portion OSP and an inner surface portion ISP with the inner surface portion facing opposite the outer surface portion and toward bumper mount cavity BMC.

In some cases, jounce bumper mount JBM may be referred to in the art as a jounce bumper mounting cup that is oriented such that open end OPN faces toward lower structural component LSC. As indicated above, jounce bumper mount JBM may, in some cases, be provided on or along a structural component as an original part of a vehicle or other device. In such case, the jounce bumper mount will, in many cases, be rigidly affixed to the associated structural component (e.g., upper structural component USC or lower structural component LSC), such as by way of a flowed-material joint FMJ (FIG. 9) and/or one or more securement devices, for example.

A mounting bracket assembly in accordance with the subject matter of the present disclosure, such as mounting bracket assembly 300, for example, can include any suitable number of one or more components and/or structures suitable for securing the mounting bracket assembly on or along an exterior of a jounce bumper mount (e.g., jounce bumper mount JBM). As a non-limiting example, mounting bracket assembly 300 can include a base bracket 304 and one or more clamp brackets that secure the base bracket on or along the jounce bumper mount (e.g., jounce bumper mount JBM). Base bracket 304 can include a base bracket wall 306 with a base wall portion 308 and a support wall portion 310. Base wall portion 308 is oriented and extends generally transverse to bumper mount axis BMA. Support wall portion 310 extends from along the base wall portion in a direction away from lower structural component LSC toward a bracket distal edge 312. Base wall portion 308 can include an outer peripheral edge 314 that extends around at least a portion thereof with a surface portion 316 and a surface portion 318. As shown in FIGS. 2-9, surface portion 316 faces toward jounce bumper mountJBM and surface portion 318 is oriented toward gas spring assembly 200. In an assembled condition, surface portion 316 can be disposed in abutting engagement with distal edge DEG of side wall portion SWP of jounce bumper mount JBM and surface portion 318 can be disposed in abutting engagement with an exterior surface 242 of end member 204.

Figure 6:
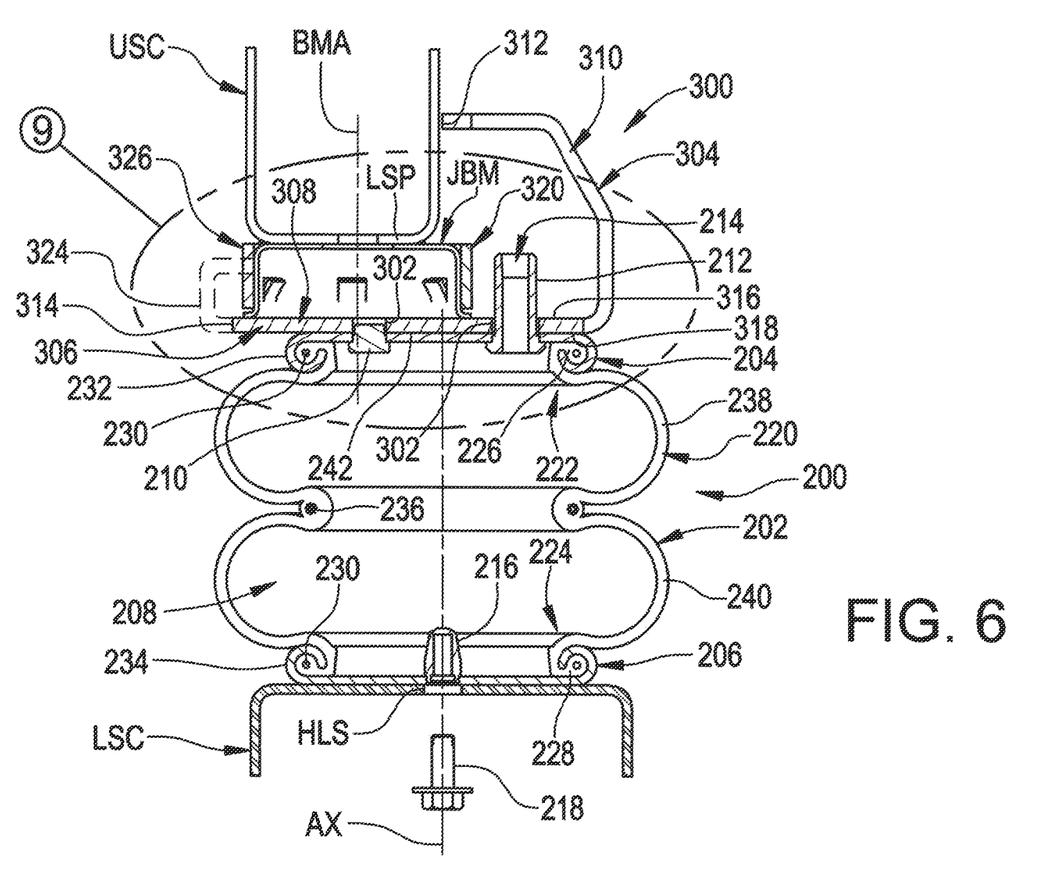
FIG. 6 is a cross-sectional view of the exemplary mounting bracket assembly in FIGS. 2-5 taken from along line 6-6 in FIG. 4.
Figure 7:
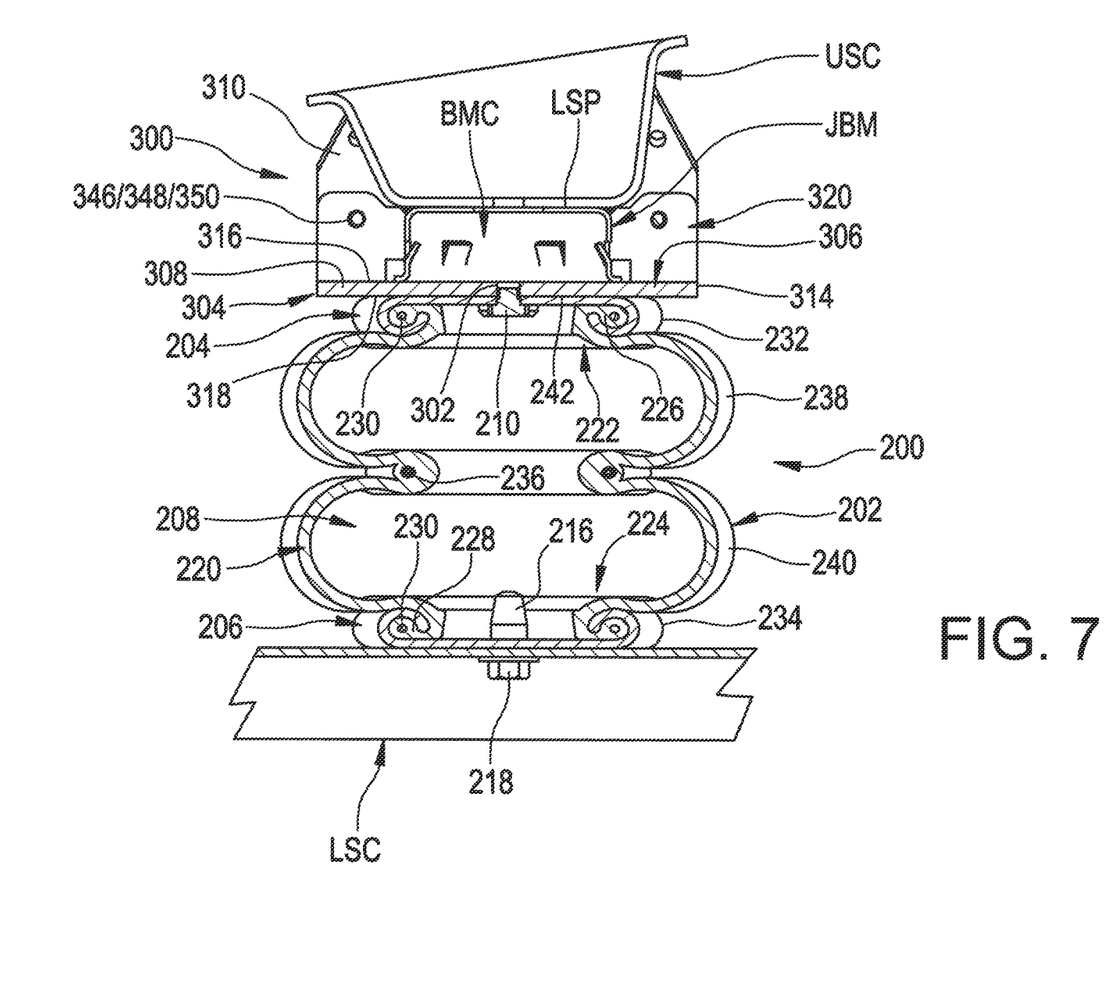
FIG. 7 is a cross-sectional view of the exemplary mounting bracket assembly in FIGS. 2-6 taken from along line 7-7 in FIG. 5.
Figure 8:
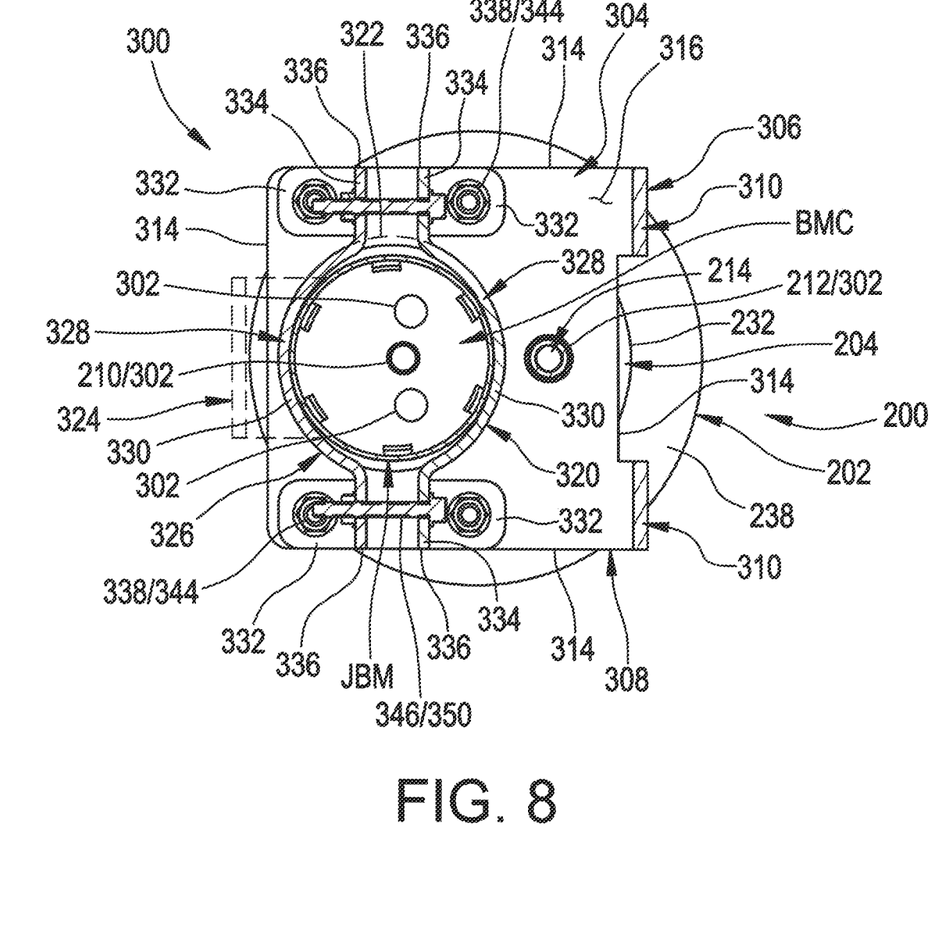
FIG. 8 is a cross-sectional view of the exemplary mounting bracket assembly in FIGS. 2-7 taken from along line 8-8 in FIG. 5.
Figure 9:
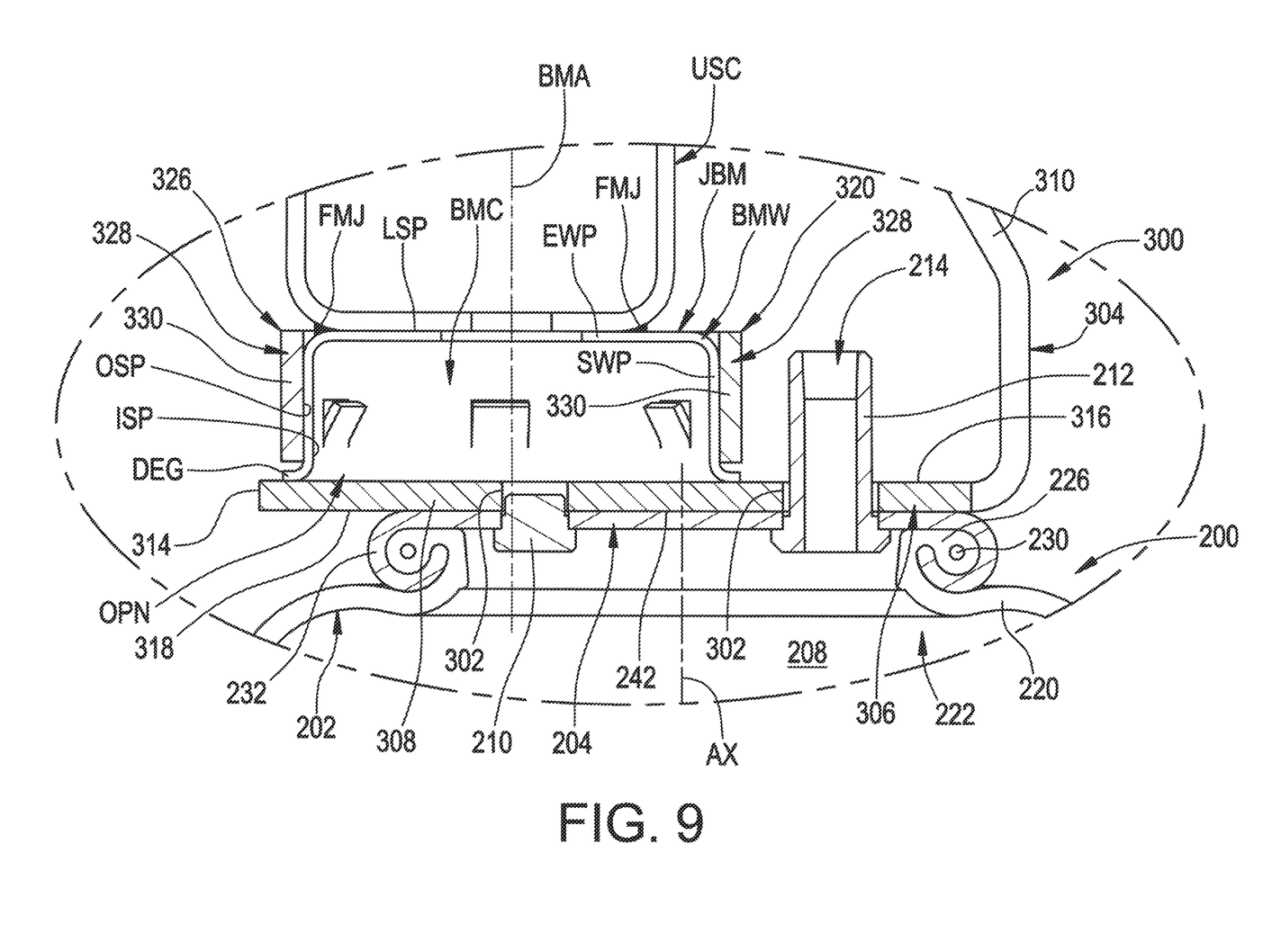
FIG. 9 is an enlarged view of the portion of the mounting bracket assembly in FIGS. 2-8 identified as Detail 9 in FIG. 6.
Figure 10:
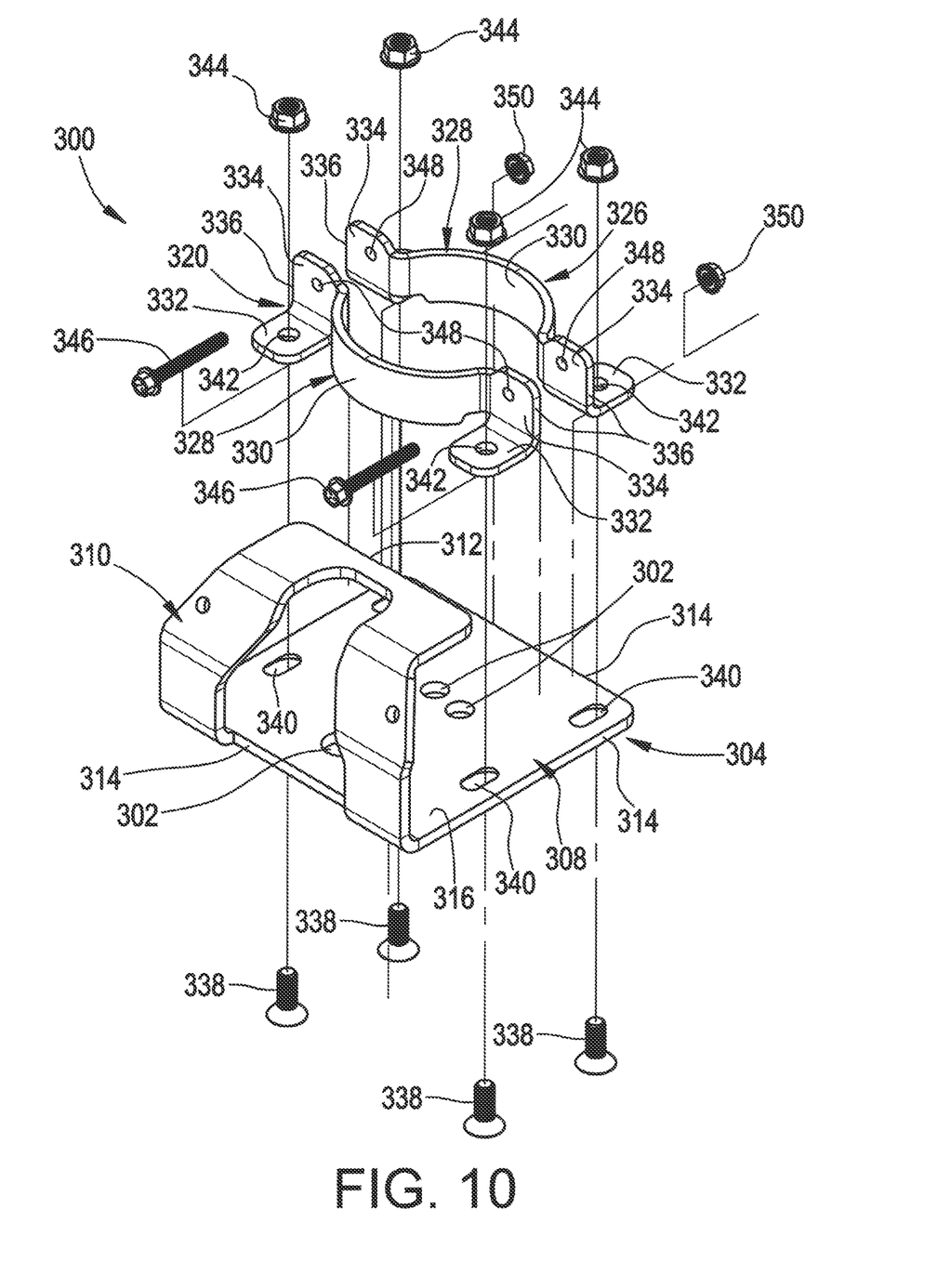
FIG. 10 is an exploded top perspective view of the exemplary mounting bracket assembly in FIGS. 2-9.
Figure 11:
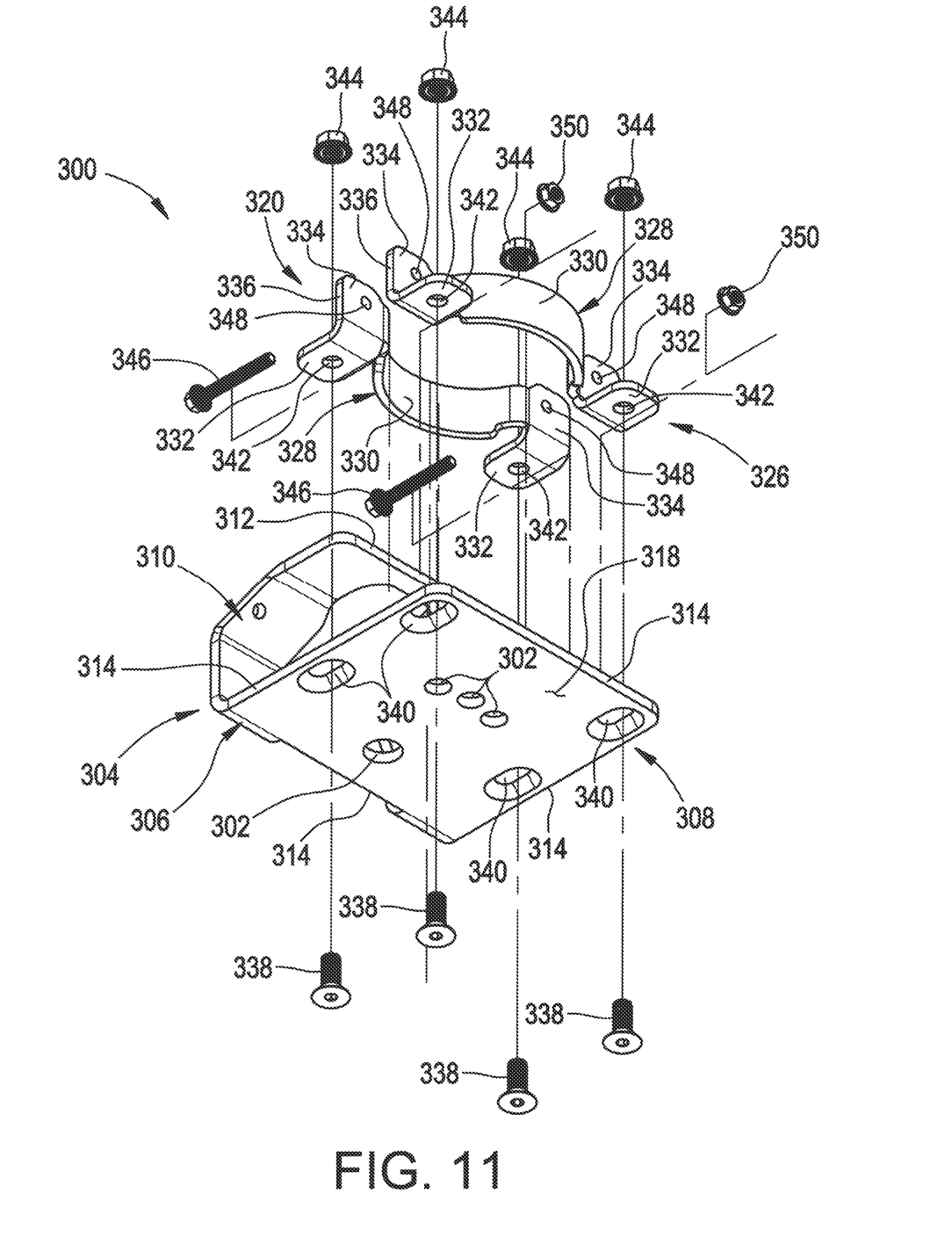
FIG. 11 is an exploded bottom perspective view of the exemplary mounting bracket assembly in FIGS. 2-10.

A mounting bracket assembly in accordance with the subject matter of the present disclosure, such as mounting bracket assembly 300, for example, can also include one or more clamp brackets extending around and axially coextensively along an exterior surface portion (e.g., outer surface portion OSP) of the jounce bumper mount. As a non-limiting example, mounting bracket assembly 300 can include a clamp bracket 320 that is separate from but secured to base bracket 304, and extends along outer surface portion OSP of jounce bumper mount JBM. In some cases, a single clamp bracket may be used, such as a clamp bracket that extends peripherally about more than half of jounce bumper mount JBM, as is represented in FIG. 8 by dashed line 322. In other cases, base bracket wall 306 of base bracket 304 could include one or more fixed wall portions against which clamp bracket 320 could capture or secure jounce bumper mount JBM. As an alternate construction, such one or more fixed wall portions are represented in FIGS. 6 and 8 by dashed lines 324. In still other cases, two or more clamp brackets can be used, such as clamp bracket 320 together with a clamp bracket 326 that is separate from base bracket 304 as well as clamp bracket 320. In some cases, the two or more clamp brackets can be substantially identical, such as is shown in FIGS. 2-11, for example. In other cases, however, the two or more clamp brackets can have different configurations and/or constructions.

Regardless of the type, kind and/or construction of the one or more clamp brackets (e.g., clamp brackets 320,322 and/or 326) together with any, optional, fixed wall portions (e.g., fixed wall portions 324), mounting bracket assembly 300 is at least partially secured to the associated structural component (e.g., upper structural component USC) by capturing or otherwise securing jounce bumper mount JBM within or between one or more clamp brackets and/or between a clamp bracket and other structures. Additionally, any one or more of the clamp brackets that are separate from the base bracket are secured on or along base bracket 304 in a suitable manner. For example, clamp brackets 320, 322 and/or 326 can include a clamp wall 328 with a side wall portion 330 that extends peripherally along at least part of outer surface portion OSP of side wall portion SWP. Clamp wall 328 can also include one or more mounting wall portions 332 that extend along base wall portion of base bracket wall 306 in an assembled condition. Clamp wall 328 can further include one or more flange wall portions 334 that extend outwardly from along side wall portion 330 toward a distal edge 336. In an assembled condition, side wall portion 330 can be axially coextensive with at least side wall portion SWP of bumper mount wall BMW. Securement devices 338 (e.g., threaded bolts) can extend through holes or slots 340 in base wall portion 308 as well as corresponding holes 342 in mounting wall portions 332 to receive corresponding securement devices 344 (e.g., threaded nuts) and thereby secure clamp brackets 320, 322 and/or 326 on or along base bracket 304. Additionally, one or more securement devices 346 (e.g., threaded bolts) can extend through holes 348 in flange wall portions 334 to receive corresponding securement devices 350. In this manner, the one or more clamp brackets can be secured in abutting engagement with the corresponding jounce bumper mount to secure mounting bracket assembly 300 on or along the associate structural component (e.g., upper or lower structural component USC/LSC).

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different structures, features and/or components are presented in the embodiments shown and described herein, and that no one embodiment may be specifically shown and described as including all such structures, features and components. As such, it is to be understood that the subject matter of the present disclosure is intended to encompass any and all combinations of the different structures, features and components that are shown and described herein, and, without limitation, that any suitable arrangement of structures, features and components, in any combination, can be used. Thus, it is to be distinctly understood claims directed to any such combination of structures, features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A suspension assembly operatively disposed between associated sprung and unsprung masses of an associated vehicle, said suspension assembly comprising:
   a jounce bumper mount operatively connected to one of the associated sprung and unsprung masses, said jounce bumper mount having a longitudinal axis and including a mount wall with an end wall portion disposed in transverse relation to said axis and a side wall portion extending axially from along said end wall portion toward a distal edge, said side wall portion including an outer peripheral surface portion and an inner peripheral surface portion with said inner peripheral surface portion at least partially defining a cavity within said jounce bumper mount having an open end along said distal edge, said jounce bumper mount oriented such that said end wall portion is disposed toward said one of the associated sprung and unsprung masses and such that said open end is disposed toward the other of the associated sprung and unsprung masses;
   a base bracket including a base bracket wall with a base wall portion oriented transverse to said longitudinal axis, said base wall portion including a first surface portion and a second surface portion facing opposite said first surface portion, said base bracket positioned along said jounce bumper mount with said first surface portion disposed in abutting engagement with said distal edge of said jounce bumper mount and extending at least partially across said open end thereof;
   a clamp secured to said base bracket along said first surface portion thereof and extending at least partially along said side wall portion of said jounce bumper mount in abutting engagement with said outer peripheral surface portion; and,
   a suspension component operatively connected to said base bracket along said second surface portion thereof.

2. A suspension assembly according to claim 1, wherein said suspension component is a spring.

3. A suspension assembly according to claim 2, wherein said spring is a gas spring including a first end member operatively connected to said second surface portion of said base bracket, a second end member spaced from said first end member and operatively secured to the other of the associated sprung and unsprung masses, and a flexible wall operatively connected between said first and second end members and at least partially defining a spring chamber.

4. A suspension assembly according to claim 1, wherein said base bracket includes a support wall portion extending from along said base wall portion in a direction opposite said second surface portion.

5. A suspension assembly according to claim 1, wherein said clamp includes a clamp wall with a side wall portion extending in abutting engagement along said outer peripheral surface portion of said jounce bumper mount.

6. A suspension assembly according to claim 5, wherein said clamp wall includes a mounting wall portion extending from said side wall portion along said first surface portion of said base wall portion of said base bracket wall.

7. A suspension assembly according to claim 6 further comprising a fastener extending between and operatively connecting said mounting wall portion of said clamp wall and said base wall portion of said base bracket wall.

8. A suspension assembly according to claim 5, wherein said clamp wall includes a flange wall portion extending outwardly from along said side wall portion.

9. A suspension assembly according to claim 8 further comprising a fastener extending through said flange wall portion and securing said clamp in abutting engagement with said outer peripheral surface portion of said jounce bumper mount.

10. A suspension assembly according to claim 1, wherein said base bracket wall includes a fixed wall portion extending outward beyond said first surface portion in a direction opposite said second surface portion, and said jounce bumper mount is captured between said fixed wall portion and said clamp.

11. A suspension assembly according to claim 1, wherein said clamp includes a clamp wall extending peripherally around more than half of said jounce bumper mount such that said jounce bumper mount is captured by a single clamp.

12. A suspension assembly according to claim 1, wherein said clamp is a first clamp and said suspension assembly further comprises a second clamp secured to said base bracket with said jounce bumper mount captured between said first and second clamps.

13. A mounting bracket assembly for securing an associated suspension component along one of an associated sprung mass and an associated unsprung mass of an associated vehicle, the one of the associated sprung and unsprung masses including an associated jounce bumper mount with an associated longitudinal axis and an associated side wall portion extending toward an associated distal edge at least partially defining an associated open end, the associated side wall portion including an associated outer peripheral surface portion, said mounting bracket assembly comprising:
   a base bracket including a base bracket wall with a base wall portion oriented transverse to the associated longitudinal axis, said base wall portion including a first surface portion and a second surface portion facing opposite said first surface portion, said base bracket positioned along the associated jounce bumper mount with said first surface portion dimensioned to abuttingly engage the associated distal edge of the associated jounce bumper mount and extend at least partially across the associated open end thereof; and,
   a clamp secured to said base bracket along said first surface portion thereof and extending peripherally along the associated side wall portion of the associated jounce bumper mount in abutting engagement with the associated outer peripheral surface portion and co-extensively therewith.

14. A mounting bracket assembly according to claim 13, wherein said base bracket wall includes a fixed wall portion extending outward beyond said first surface portion in a direction opposite said second surface portion, and the associated jounce bumper mount is captured between said fixed wall portion and said clamp.

15. A mounting bracket assembly according to claim 13, wherein said clamp includes a clamp wall extending peripherally around more than half of said jounce bumper mount such that said jounce bumper mount is captured by a single clamp.

16. A mounting bracket assembly according to claim 13, wherein said clamp is a first clamp and said mounting bracket assembly further comprises a second clamp secured to said base bracket with said jounce bumper mount captured between said first and second clamps.

17. A method of securing an associated suspension component along one of an associated sprung mass and an associated unsprung mass of an associated vehicle, the one of the associated sprung and unsprung masses including an associated jounce bumper mount with an associated longitudinal axis and an associated side wall portion extending toward an associated distal edge at least partially defining an associated open end, the associated side wall portion including an associated outer peripheral surface portion, said method comprising:

providing a base bracket including a base bracket wall with a base wall portion oriented transverse to the associated longitudinal axis, said base wall portion including a first surface portion and a second surface portion facing opposite said first surface portion;

positioning said base bracket along the associated jounce bumper mount with said first surface portion abuttingly engaging the associated distal edge of the associated jounce bumper mount and extending at least partially across the associated open end thereof;

providing a clamp and positioning said clamp peripherally along the associated side wall portion of the associated jounce bumper mount in abutting engagement with the associated outer peripheral surface portion;

securing said clamp to said base bracket along said first surface portion thereof; and, operatively connecting a suspension component along said second surface portion of said base bracket.

18. A method according to claim 17, wherein providing said clamp includes providing a clamp that includes a clamp wall with a side wall portion and positioning said clamp includes positioning said side wall portion in abutting engagement along said outer peripheral surface portion of said jounce bumper mount.

19. A method according to claim 17, wherein providing said base bracket includes providing said base bracket wall with a fixed wall portion extending outward beyond said first surface portion in a direction opposite said second surface portion, and positioning said base bracket includes positioning the associated jounce bumper mount between said fixed wall portion and said clamp.

20. A method according to claim 17, wherein:

providing said clamp includes providing first and second clamps;

securing said clamp includes securing said first and second clamps to said base bracket along said first surface portion thereof; and, positioning said base bracket includes positioning the associated jounce bumper mount between said first and second clamps.

* * * * *